UNITED STATES PATENT OFFICE.

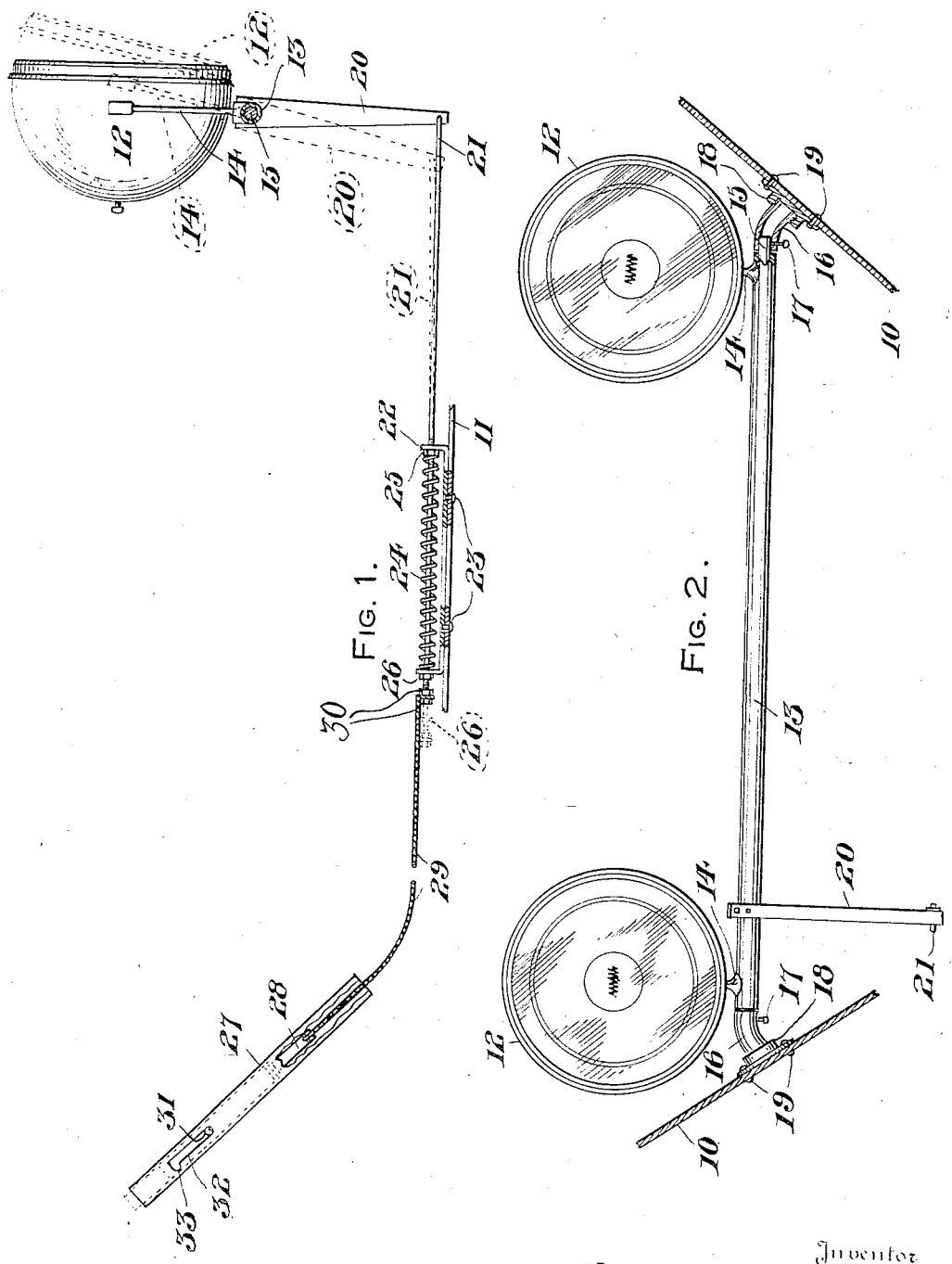

JAMES C. ANNIN, OF CALEDONIA, NEW YORK.

HEADLIGHT-TILTING MECHANISM.

1,246,377.

Specification of Letters Patent.   Patented Nov. 13, 1917.

Application filed January 29, 1917.   Serial No. 145,155.

*To all whom it may concern:*

Be it known that I, JAMES C. ANNIN, a citizen of the United States, residing at Caledonia, in the county of Livingston and State of New York, have invented certain new and useful Improvements in Headlight-Tilting Mechanism, of which the following is a specification.

This invention relates to new and useful improvements in headlight tilting mechanism.

The primary object of the invention is the provision of combined mounting and tilting means for the headlights of automobiles whereby the axes of the projected rays may be inclined forwardly and downwardly operable from a point adjacent the driver's seat and thereby preventing the headlights from glaring and dazzling the eyes of the public.

A further object of the device is the provision of a fender-carried bracket for tiltingly mounting a plurality of headlights for the vehicle, the headlights being readily tilted by the driver when desired, but normally maintained in an upright position.

With these general objects in view and others that will appear as the nature of the invention is better understood, the same consists in the combination and arrangement of parts hereinafter fully described, illustrated in the accompanying drawing and pointed out in the appended claims.

In the drawing forming a part of this application and in which like designating characters refer to corresponding parts throughout the several views, Figure 1 is a vertical sectional view through the device showing parts thereof in section and with portions broken away, and Fig. 2 is a front view of the same partially broken away with the mounting fenders shown in section.

The present device provides an arrangement for mounting headlights upon a vehicle in such a manner as to be readily tilted manually by the operator of the automobile and the device is herein illustrated in connection with the usual fender guards 10 for the front wheels of a vehicle, a portion 11 of the frame being also shown.

Two headlights 12 are provided secured upon a sleeve 13 by means of brackets 14, the said sleeve being revolubly journaled upon a shaft 15 secured within arcuate or L tubes 16 by means of set screws 17, the outer ends of the elbow being threaded within socketed bosses 18 secured to the inner sides of the fenders 10 by suitable holdfast devices such as rivets 19.

The sleeve 13 is arranged in this manner forwardly of the automobile and the same is adapted for partial revolution by means of a depending lever 20 having its upper end secured thereto, while an operating rod 21 is pivoted to its lower end and extends rearwardly toward the driver's seat of the automobile and is slidably journaled through a U-shaped mount or cage 22 secured to the automobile frame 11 by rivets 23.

A helical spring 24 encircles the rod 21 within the case 22, the rear end of said spring seating against the rear end of the cage, while the forward end of the spring 24 engages an abutment or shoulder 25 fixed upon the said rod and whereby the rod is normally held in its forward position with the lever 20 and the head lights 12 vertically disposed. A stop-nut 26 is carried by the rod 21 rearwardly of the rear end of the cage 22, which nut, as well as the shoulder 25 is in engagement with the ends of the cage 22 when the headlights 12 are in their normal position.

A tubular casing 27 is arranged at a point convenient to the driver's seat of the automobile, the same being preferably attached to the inclined casing of the steering post and readily accessible by the operator from the driver's seat. A cylindrical bar 28 is slidably journaled within the tube 27 being connected by means of a suitable flexible member such as a metal cable 29 with the rear end of the rod 21, and herein illustrated as being secured thereto by means of lock nuts 30. An operating handle 31 laterally projects from the bar 28 through an L-shaped or bayonet slot 32 arranged in one side of the tube 17, which handle 31 may be readily grasped for pulling the bar 28 and cable 29 upwardly, thereby rearwardly forcing the rod 21 against the action of the spring 24 and tilting the lever 20 and headlights 12 to the position illustrated by dotted lines in Fig. 1 of the drawing.

The spring 24 normally returns the bar 28 and cable 29 to their lower positions as well as the lever 20 and headlights 12 to their upright positions, while it will be noted that the handle 31 may be seated within the notch 33 of the slot 32 when it is found desirable to temporarily retain the headlights tilted downwardly. The tube 27 may be clamped or in any other manner fixedly secured to the steering post of the vehicle, while the headlight mounting sleeve 13 may be attached to the end portions of the automobile, or to the fenders if desired, and by a different tiltable mounting construction from that herein disclosed, the present embodiment of the invention, however, is believed to be preferable. A ready means is provided for preventing the headlights of the vehicle from being dangerous to the drivers of oncoming automobiles and by a means easily operated by the driver, tending to prevent accidents from such causes.

What I claim as new is:

1. A device of the class described comprising in combination with the fenders of a vehicle, attaching means carried by the said fenders, a shaft removably secured between the said attaching means, a sleeve journaled upon the said shaft, headlights fixed upon the said sleeve, a depending lever carried by the said sleeve and shifting means for the lever operable at a distance therefrom.

2. A device of the class described comprising in combination with the fenders of a vehicle, attaching means carried by the said fenders, a shaft removably secured between the said attaching means, a sleeve journaled upon the said shaft, headlights fixed upon the said sleeve, a depending lever carried by the said sleeve, a shifting means for the headlights attached to said lever and extending to a point adjacent the driver's seat of the vehicle, and a return-spring for the shifting means whereby the headlights are automatically returned to their normal position.

3. A device of the class described comprising in combination with the fenders of a vehicle, attaching means carried by the said fenders, a shaft removably secured between the said attaching means, a sleeve journaled upon the said shaft, headlights fixed upon the said sleeve, a depending lever carried by the said sleeve, shifting means for the lever operable at a distance therefrom, a cage carried by the frame of the automobile, an operating rod pivoted to the said lever slidably positioned through the said cage, a normal positioning means for the rod carried by the said cage, and an adjustable operating means attached to the rod and positioned adjacent the driver's seat of the vehicle.

4. A device of the class described comprising in combination with the fenders of a vehicle, attaching means carried by the said fenders, a shaft removably secured between the said attaching means, a sleeve journaled upon the said shaft, headlights fixed upon the said sleeve, a depending lever carried by the said sleeve, shifting means for the lever operable at a distance therefrom, a cage carried by the frame of the automobile, an operating rod pivoted to the said lever slidably positioned through the said cage, a normal positioning means for the rod carried by the said cage, a tube adjacent the driver's seat and having a slot in the side thereof provided with a notch at its upper end, a bar longitudinally slidable within the said tube, flexible connections between the adjacent ends of said bar and rod, and an operating handle carried by the bar and projecting through said slot and adapted for seating within the said notch when the headlights are in their tilted position.

5. A headlight mount and adjusting means for vehicles comprising in combination with the fenders of the vehicle, socketed bosses carried by the inner faces thereof, tubular L's threaded within said bosses, a shaft arranged within said L's connecting the same, set screws between said shaft and L's, a sleeve journaled upon said shaft, headlights mounted upon said sleeve, an operating lever carried by the sleeve, a tube arranged adjacent the driver's seat of the vehicle having a slot therein provided with a seating notch at its upper end, a bar slidably arranged within the said tube, connections between the said bar and lever and an operating handle carried by the bar projecting through the said slot.

6. A headlight mount and adjusting means for vehicles comprising in combination with the fenders of the vehicle, socketed bosses carried by the inner faces thereof, tubular L's threaded within said bosses, a shaft arranged within said L's connecting the same, set screws between said shaft and L's, a sleeve journaled upon said shaft, headlights mounted upon said sleeve, an operating lever carried by the sleeve, a tube arranged adjacent the driver's seat of the vehicle having a slot therein provided with a seating notch at its upper end, a bar slidably arranged within the said tube, a connector between the said bar and lever, a mount carried by the vehicle through which the said connector is slidably journaled, a shoulder carried by said connector within the mount and a spring tensioned between said mount and shoulder adapted for automatically retaining said connector and lever in their normal position.

In testimony whereof I affix my signature.

JAMES C. ANNIN.